UNITED STATES PATENT OFFICE.

GEORG KASZNER, OF MÜNSTER, GERMANY, ASSIGNOR TO RHEINISCHE DAMPFKESSEL UND MASCHINEN-FABRIK BÜTTNER G. M. B. H., OF UERDINGEN-ON-THE-RHINE, GERMANY.

PROCESS OF OBTAINING AND SEPARATING OXYGEN AND NITROGEN FROM THE ATMOSPHERE.

1,015,566. Specification of Letters Patent. Patented Jan. 23, 1912.

No Drawing. Application filed May 20, 1911. Serial No. 628,493.

*To all whom it may concern:*

Be it known that I, GEORG KASZNER, a subject of the King of Prussia, and resident of Münster, in the Province of Westphalia, German Empire, have invented a new and useful Process for Obtaining and Separating Oxygen and Nitrogen from the Atmosphere, of which the following is a specification.

This invention relates to an improved process for obtaining and separating oxygen and nitrogen from the atmosphere by the well known method consisting in the alternate formation and decomposition of an alkaline manganate or permanganate by alternately subjecting the same or a mixture of alkaline hydrate and a manganese oxid to the action of steam and air. The efficient carrying out of the process is however prevented owing to the physical action of the alkali which is freed during the action of the steam upon the reacting mixture, inasmuch as the alkali causes the reacting mixture to become soft or plastic and fills up the pores of the same. Furthermore under the influence of the steam the alkali separates from the manganese oxids. Under both conditions the alkaline particles as separated from the particles of the manganese oxid ($MnO_2$ and the like) necessary for the reformation of the manganate and thus an efficient reformation does not take place on the admission of the air current.

According to the present invention these deficiencies are obviated by the addition to the reacting mixture or manganate of a substance which is capable of uniting with the alkali freed during the action of the steam, the alkaline compound thus formed being decomposed on the reformation of the manganate by the admission of air, the alkali being freed by the decomposition so as to be capable of reaction with the manganese oxids. For this purpose it is preferable to employ the meta-plumbates of the alkalies, which combine with the excess of alkaline hydrate at a temperature of between 300–600° C, to form ortho-plumbate (for example $Na_4PbO_4$ or $K_4PbO_4$), which is a spongy compound easily capable of decomposition. When the ortho-plumbates are brought into contact with oxygen and the manganese oxids, the latter enable the alkali to be reformed from the ortho-plumbate by transforming the latter into meta-plumbate, whereupon the alkali enters into reaction with the reformation of the manganate. By the admission of steam the process of formation of ortho-plumbate takes place again with the generation of oxygen and the combination of the alkali with the meta-plumbate. In this manner any disadvantageous or excessive separation of the alkali from the manganese oxids does not take place. Moreover the reacting mass does not sinter, provided that the temperature does not rise above the necessary degree and the process may be carried out for a much longer period and more often repeated while obtaining greater efficiency than was heretofore possible.

The effect of the alkaline plumbate added to the reacting mixture increases according to the temperature employed. A small addition of the plumbate is sufficient (with about a temperature of for example 350° C.) in order to maintain the reaction, but with higher temperatures an increased quantity of plumbate must be used, until the proportion in the mass is ultimately 1 atom of manganese to 1 atom of lead.

The reaction is given in the following equations:

(a.) Generation of oxygen on the admission of steam:

$$Na_2MnO_4 + Na_2PbO_3 + H_2O = Na_4PbO_4 + MnO_2 + H_2O + O.$$

(b.) Reformation of manganate on the admission of air:

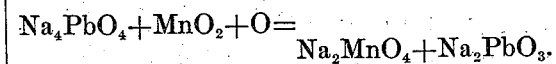
$$Na_4PbO_4 + MnO_2 + O = Na_2MnO_4 + Na_2PbO_3.$$

It will of course be readily understood that the alkaline plumbate may be added to the reacting mixture either in the form of the compound or may be generated in the reacting mixture by the addition of its components lead monoxid, oxygen or air, and alkaline hydrate, oxid or superoxid. Instead of lead monoxid the metal or any other compound of lead may be employed which is capable of yielding lead monoxid on heating or on exposure to air, as for example red lead, lead suboxid, lead peroxid, lead nitrate or the like. The manganate or permanganate can also of course be produced in the reacting mixture by its component parts. It will also be understood that only oxygen is taken from the air-current which is used to regenerate the mass and that the remainder of the air consists of pure or nearly pure nitrogen which in the same way as the oxygen may be collected in any desired manner.

I claim:—

1. In a process for separating and obtaining oxygen and nitrogen from the atmosphere by means of the alternate formation, under the action of air, and decomposition, under the action of steam, of alkaline manganates or permanganates; the addition of a substance capable of combining with the alkaline hydrate freed during the action of the steam, the compound thus formed readily decomposing and yielding the alkaline hydrate on the action of air.

2. In a process for separating and obtaining oxygen and nitrogen from the atmosphere by means of the alternate formation, under the action of air, and decomposition, under the action of steam, of alkaline manganates or permanganates; the addition of substances capable of uniting in the reaction mixture to form a compound capable of combining with the alkaline hydrate freed during the action of the steam, the compound thus formed readily decomposing and yielding the alkaline hydrate on the action of air.

3. In a process for separating and obtaining oxygen and nitrogen from the atmosphere by means of the alternate formation, under the action of air, and decomposition under the action of steam, of alkaline manganates or permanganates; the addition of an alkaline meta-plumbate which is capable of combining with the alkaline hydrate freed during the action of the steam to form alkaline ortho-plumbate which readily decomposes and yields the alkaline hydrate on the action of air.

4. In a process for separating and obtaining oxygen and nitrogen from the atmosphere by means of the alternate formation, under the action of air, and decomposition, under the action of steam, of alkaline manganates or permanganates; the addition of substances capable of uniting in the reacting mixture to form an alkaline meta-plumbate which is capable of combining with the alkaline hydrate, freed during the action of the steam, to form alkaline ortho-plumbate, which readily decomposes and yields the alkaline hydrate on the action of air.

In witness whereof I have hereunto set my hand in the presence of two witnesses.

GEORG KASZNER. [L. S.]

Witnesses:
 ALBERT F. NUFER,
 ALFRED HENKEL.